United States Patent
Brudnicki (10) Patent No.: US 6,838,204 B1
(45) Date of Patent: Jan. 4, 2005

(54) METHOD AND APPARATUS FOR FUEL CELL PACKAGING

(75) Inventor: Myron J. Brudnicki, San Pedro, CA (US)

(73) Assignee: Hybrid Power Generation Systems, LLC, Torrance, CA (US)

( * ) Notice: Subject to any disclaimer, the term of this patent is extended or adjusted under 35 U.S.C. 154(b) by 0 days.

(21) Appl. No.: 09/415,467

(22) Filed: Oct. 8, 1999

(51) Int. Cl.⁷ ............ H01M 2/00; H01M 2/02; H01M 8/00; H01M 8/04; H01M 8/10

(52) U.S. Cl. .............. 429/34; 429/12; 429/32; 429/35

(58) Field of Search ............ 429/62, 34, 35, 429/32

(56) References Cited

U.S. PATENT DOCUMENTS

| | | | | |
|---|---|---|---|---|
| 3,554,803 A | | 1/1971 | Poirier ................ | 136/86 |
| 4,176,213 A | * | 11/1979 | Van Linden ............ | 429/12 |
| 4,329,403 A | | 5/1982 | Baker .................. | 429/35 |
| 4,342,816 A | | 8/1982 | Kothmann et al. ....... | 429/13 |
| 4,397,917 A | | 8/1983 | Chi et al. ............. | 429/26 |
| 4,444,851 A | | 4/1984 | Maru ................... | 429/26 |
| 4,670,361 A | | 6/1987 | Tsutsumi et al. ........ | 429/34 |
| 4,743,519 A | | 5/1988 | Kaji et al. ............ | 429/36 |
| 4,778,736 A | | 10/1988 | Kaji et al. ............ | 429/38 |
| 4,876,163 A | * | 10/1989 | Reichner ............... | 429/30 |
| 4,910,101 A | | 3/1990 | Mitsuda et al. ......... | 429/38 |
| 5,023,152 A | | 6/1991 | Akagi .................. | 429/32 |
| 5,252,409 A | | 10/1993 | Akagi .................. | 429/32 |
| 5,419,981 A | | 5/1995 | Golben ................. | 429/37 |
| 5,549,982 A | | 8/1996 | Akagi .................. | 429/30 |
| 5,595,833 A | * | 1/1997 | Gardner et al. ......... | 429/19 |
| 5,783,324 A | | 7/1998 | Binder et al. .......... | 429/31 |
| 5,858,567 A | | 1/1999 | Spear, Jr. et al. ...... | 429/12 |
| 5,863,671 A | | 1/1999 | Spear, Jr. et al. ...... | 429/12 |

\* cited by examiner

*Primary Examiner*—Patrick Ryio
*Assistant Examiner*—Julian Mercado
(74) *Attorney, Agent, or Firm*—Sutherland Asbill & Brennan LLP (57) ABSTRACT

A method and apparatus for fuel cell packaging are embodied in a pair of complementary fuel cell receptacles within which a stack of fuel cells are housed in a staggered or spiral configuration. The fuel cells are provided with ports positioned in their corner portions. The fuel cell receptacles include a plurality of port interfacing surfaces over which the corners of the fuel cells are positioned, thereby providing direct fluidic interfaces between the flow field areas of the fuel cells and the receptacles. In a preferred embodiment, o-rings are employed at the fluidic interfaces between the fuel cells and the receptacles. The fuel cell receptacles also include manifolds and a plurality of conduits between the port interfacing surfaces and the manifolds. In a preferred embodiment, the manifolds vary in depth along the receptacles such that the conduits are substantially equal in length. The fuel cell receptacles are detachably secured together and facilitate the employment of a mechanism for pressing the stack of fuel cells together to ensure good electrical contacts between adjacent fuel cells of the stack.

11 Claims, 8 Drawing Sheets

METHOD AND APPARATUS FOR FUEL CELL PACKAGING

STATEMENT REGARDING FEDERALLY SPONSORED RESEARCH AND DEVELOPMENT

This invention was made with support from the government of the United States of America. The government of the United States of America may have certain rights in this invention.

BACKGROUND OF THE INVENTION

1. Field of Invention

The present invention relates generally to a method and apparatus for fuel cell packaging and, more specifically, to a method and apparatus for fuel cell packaging employing a receptacle shaped to receive fuel cells in a staggered or spiral configuration.

2. Description of the Related Art

Fuel cells such as, the Proton Exchange Membrane ("PEM") fuel cell include a membrane electrode assembly ("MEA"). The MEA comprises a solid polymer electrolyte or ion exchange membrane positioned between an anode and a cathode which typically comprise finely divided carbon particles, very finely divided catalytic particles supported on the internal and external surfaces of the carbon particles, and proton conductive material intermingled with the catalytic and carbon particles.

The catalytic particles, e.g., finely comminuted platinum, at each membrane/electrode interface induce the desired electrochemical reaction. On the anode side, the fuel (e.g., hydrogen) permeates the porous electrode material and reacts with the catalytic particles to form hydrogen cations (e.g., protons) which migrate through the ion exchange membrane to the cathode side. On the cathode side, the oxidant (e.g., gas containing oxygen) reacts with the catalytic particles to form oxygen anions. At the cathode, the anions react with the cations to complete the electrochemical reaction and form a reaction product (e.g., liquid water).

In conventional fuel cells, the MEA is positioned between a pair of electrically conductive elements, typically plates, which serve as current collectors for the anode and cathode. The plates are often formed with channels to facilitate the distribution of the aforementioned gaseous reactants over the anode and cathode catalyst surfaces. When a plurality of fuel cells are configured as a stack to form a series electrical connection between them, the plates provide the electrical connection and are often referred to as bipolar plates. In such a configuration, each bipolar plate conducts current between the anode of one cell to the cathode of the adjacent cell in the stack.

A problem with conventional fuel cell stacks is that the periphery of each fuel cell usually includes manifolds and seals which increase the size and therefore the cost of the fuel cells. Thus, a need exists for a fuel cell packaging approach which would allow for a reduction in the size of the periphery portion of the fuel cells.

Another problem with conventional fuel cell packaging approaches is that they typically include molded rubber fluid interfaces to the fuel cells which are prone to leakage. Thus, a need exists for a fuel cell packaging approach which would provide improved fluid interfaces for the fuel cells.

Another problem with conventional fuel cell packaging approaches is that it is often difficult to disassemble and reassemble the packaging to replace individual fuel cells, perform diagnostic tests, etc. Thus, a need exists for a fuel cell packaging approach which would facilitate a simple, accurate and repeatable procedure for assembling or disassembling a fuel cell stack.

SUMMARY OF THE INVENTION

According to the present invention, a method and apparatus for fuel cell packaging are embodied in a pair of complementary "cartwheel-like" fuel cell receptacles within which a stack of fuel cells are housed in a staggered or spiral configuration. The fuel cells are provided with ports positioned in their corner portions and preferably do not include manifolds. The fuel cell receptacles include a plurality of port interfacing surfaces over which the corners of the fuel cells are positioned, thereby providing fluidic interfaces between the fuel cells and the receptacles. In a preferred embodiment, o-rings are employed at the fluidic interfaces between the fuel cells and the receptacles.

The fuel cell receptacles also include manifolds and a plurality of conduits between the port interfacing surfaces and the manifolds. In a preferred embodiment, the manifolds vary in depth along the receptacles such that the conduits are substantially equal in length, thereby helping to equalize the pressure at the ports of each fuel cell.

The fuel cell receptacles are detachably secured together, thereby making the fuel cells readily accessible for testing and/or replacement. A mechanism for pressing the stack of fuel cells together is employed to ensure good electrical contacts between adjacent fuel cells of the stack.

In an exemplary preferred embodiment, a method for fuel cell packaging includes the steps of: providing a fuel cell receptacle with a plurality of manifolds; providing a plurality of fuel cells, the fuel cells including ports; and positioning the fuel cells within the fuel cell receptacle such that each of the fuel cells is in direct contact with the receptacle and each of the ports is interfaced with one of the manifolds.

In another exemplary preferred embodiment, an apparatus for fuel cell packaging includes a receptacle with port interfaces, the receptacle being shaped to receive a stack of fuels cells with ports such that the port interfaces contact each of the ports providing fluidic connections between the fuel cells and the receptacle.

In another exemplary preferred embodiment, an apparatus for fuel cell packaging includes: a housing with an upper receptacle and a lower receptacle sized to receive a plurality of fuel cells with ports; and a mechanism adapted to detachably secure the upper receptacle to the lower receptacle. The upper and lower receptacles are formed with: a plurality of manifolds, a plurality of staggered surfaces shaped to interface with the ports, and a plurality of conduits between the manifolds and the surfaces.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Figure 1:
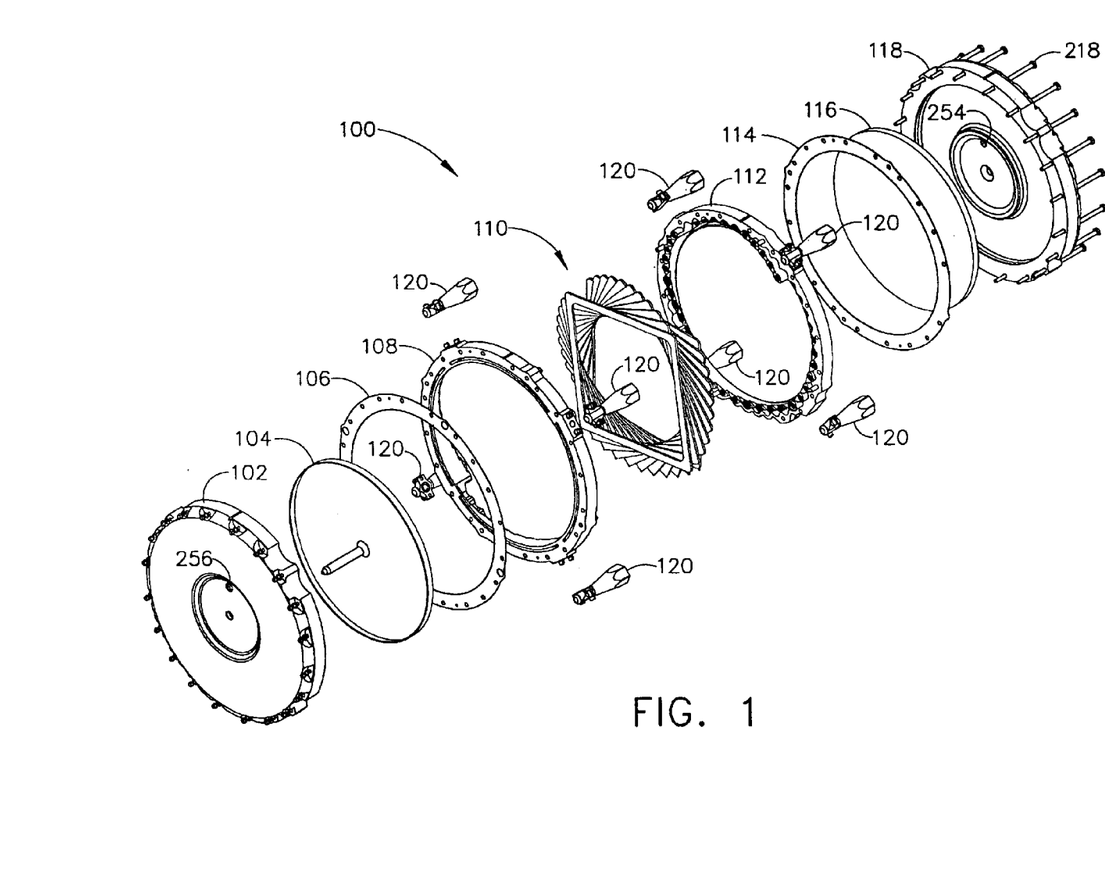
FIG. 1 is an exploded perspective view of an exemplary preferred embodiment of a fuel cell assembly according to the present invention.
Figures 2, 3:
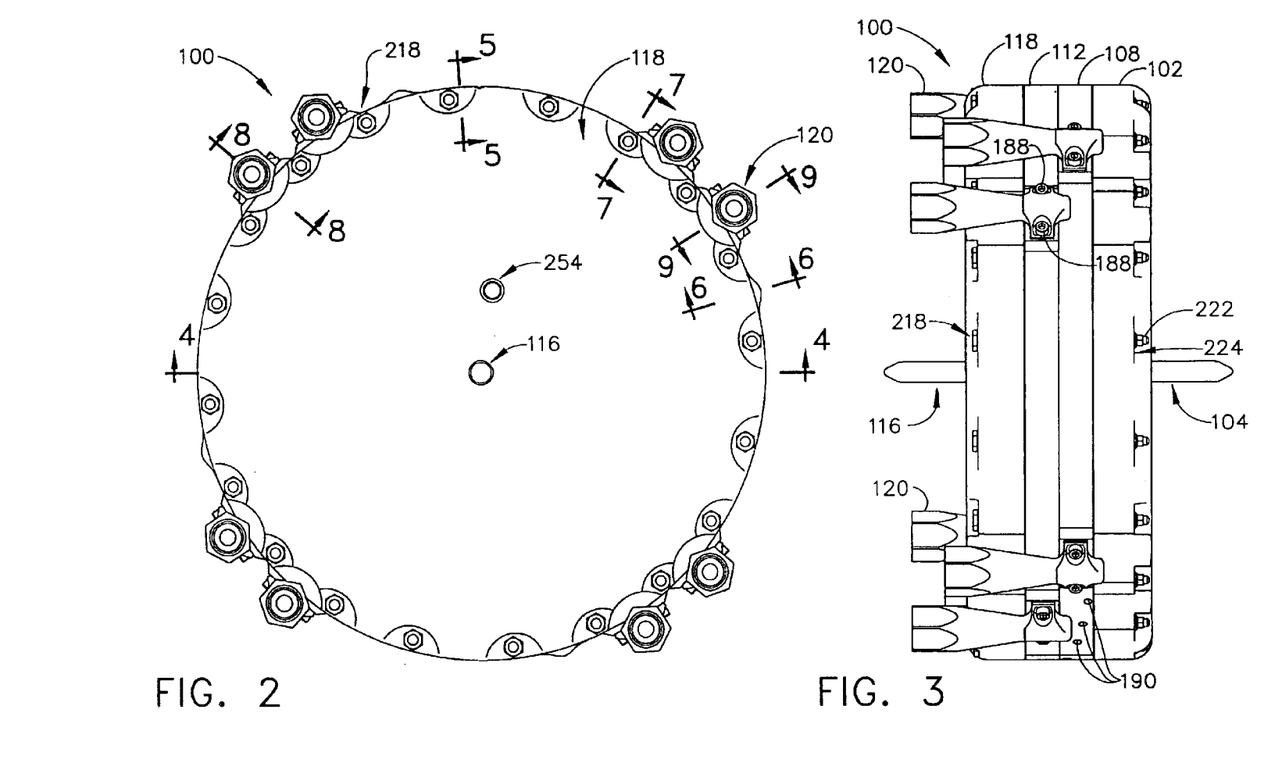
FIG. 2 is a top view of the fuel cell assembly of FIG. 1.
FIG. 3 is a right side view of the fuel cell assembly of FIG. 2.

Referring to FIG. 1, an exemplary preferred fuel cell assembly 100 according to the present invention includes a bottom end cap 102, a bottom piston 104, a bottom shim 106, a bottom fuel cell receptacle 108, a fuel cell stack 110, a top fuel cell receptacle 112, a top shim 114, a top piston 116, a top end cap 118 and a plurality of manifold inlets/outlets 120. When the fuel cell assembly 100 is assembled as shown in FIGS. 2 and 3, the fuel cell stack 110 is entirely contained within a housing provided by the bottom receptacle 108 and the top receptacle 112.

Figures 12, 13:
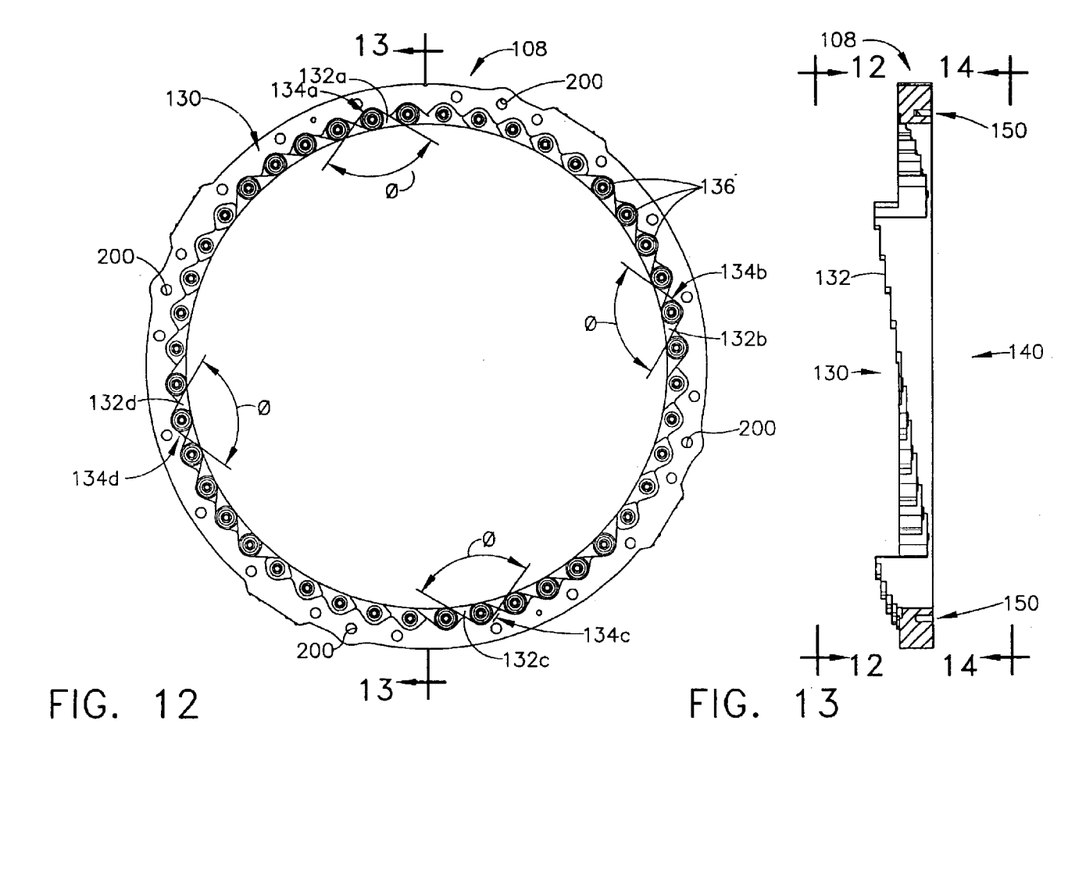
FIG. 12 is a front view of an exemplary preferred fuel cell plate receptacle of the fuel cell assembly of FIG. 1.
FIG. 13 is a cross-sectional side view of the fuel cell plate receptacle along line 13—13 of FIG. 12.
Figure 14:
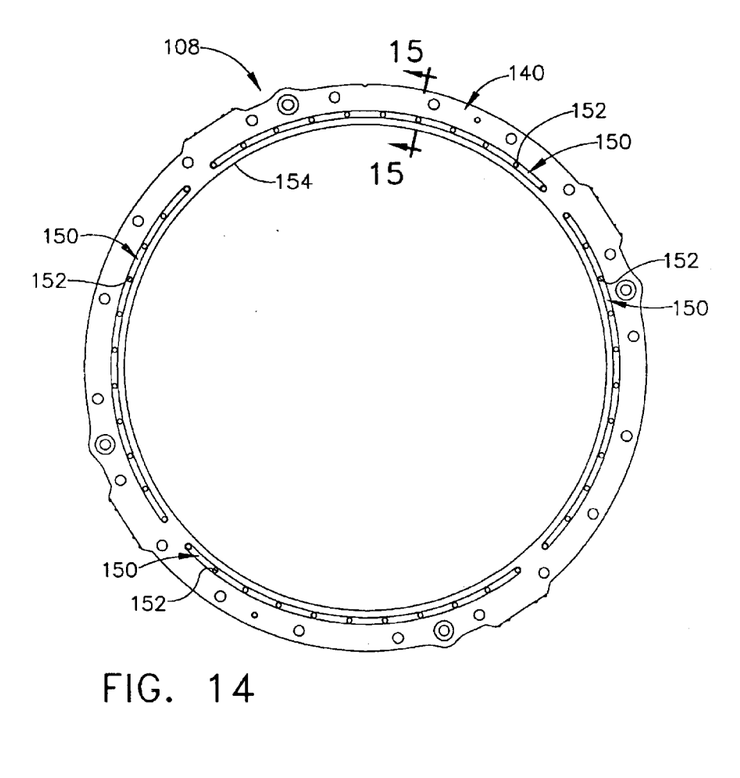
FIG. 14 is a back view of the fuel cell plate receptacle of FIG. 12.

As the receptacle 112 is complementary to the receptacle 108, the following discussion is applicable to both. Referring to FIGS. 12–14, an exemplary preferred receptacle 108 is shown in greater detail. The receptacle 108 includes a port interfacing side 130 and a manifold side 140. In an exemplary preferred receptacle 108, the port interfacing side 130 includes a plurality of port interfacing surfaces 132 which vary in their respective distances from the manifold side 140 such that the receptacle 108 is shaped to receive the fuel cells of the stack 110 in a rotationally displaced configuration, e.g., a staggered or spiral configuration. By way of example, and referring to FIG. 12, the corners of a four-sided fuel cell (not shown in this figure) are supported by the port interfacing surfaces 132a, 132b, 132c, 132d which are equidistant from the manifold side 140. The port interfacing surfaces 132a, 132b, 132c, 132d are bordered, respectively, by corner walls 134a, 134b, 134c, 134d formed in the receptacle 108 as shown. For a square or rectangular fuel cell, the corner walls 134a, 134b, 134c, 134d each define an angle ø which preferably is slightly greater than 90°, e.g., 96°, to accommodate the right angle corners of such a fuel cell. Although the corner walls 134a, 134b, 134c, 134d are shown as rounded, it should be understood that their shape can be modified as necessary to accommodate the particular shape of the fuel cells in the stack 110.

Figure 15:
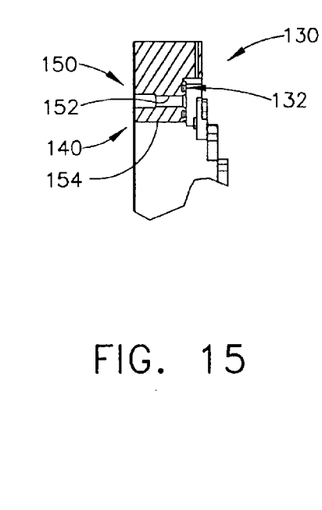
FIG. 15 is an enlarged partial cross-sectional view of the fuel cell plate receptacle along line 15—15 of FIG. 14.

The exemplary preferred receptacle 108 additionally provides fluid interfaces between ports of fuel cells in the stack 110 and the manifold inlets/outlets 120. More specifically, and referring to FIGS. 14 and 15, the exemplary preferred receptacle 108 additionally includes a plurality of manifolds 150 (to which the manifold inlets/outlets 120 are connected) and a plurality of conduits 152 which span between the manifolds 150 and the port interfacing surfaces 132. In the exemplary preferred receptacle 108, each of the manifolds 150 is positioned adjacent a perimeter 154 of the receptacle 108, is arcuate in shape as shown, and varies in depth along the perimeter 154 such that the conduits 152 are substantially equal in length. The substantially equal lengths of the conduits 152 help equalize the pressure at the ports of each fuel cell of the stack 110. Preferably, the manifold inlet 120 feeds the deep end of the manifold 150.

Before the stack 110 of fuel cells is positioned within the receptacle 108, the shim 106 is bonded to the receptacle 108 facing the manifolds 150. For example, a trace of conventional RTV silicone adhesive is applied to the manifold side 140 and then the shim 106 is heat bonded or ultrasonically welded to the manifold side 140. An exemplary preferred shim 106 is made from Lexan® 141 resin (General Electric). Exemplary preferred receptacles 108 and 112 are made from a polymer such as the PEEK™ 450G polymer (Victrex), a semi-crystalline, linear aromatic polymer which yields inherently pure materials with exceptionally low levels of ionic extractables and excellent outgassing characteristics. Exemplary preferred end caps 102 and 118 and exemplary preferred manifold inlets/outlets 120 are also made from a polymer such as the PEEK™ 450G polymer.

Figure 4:
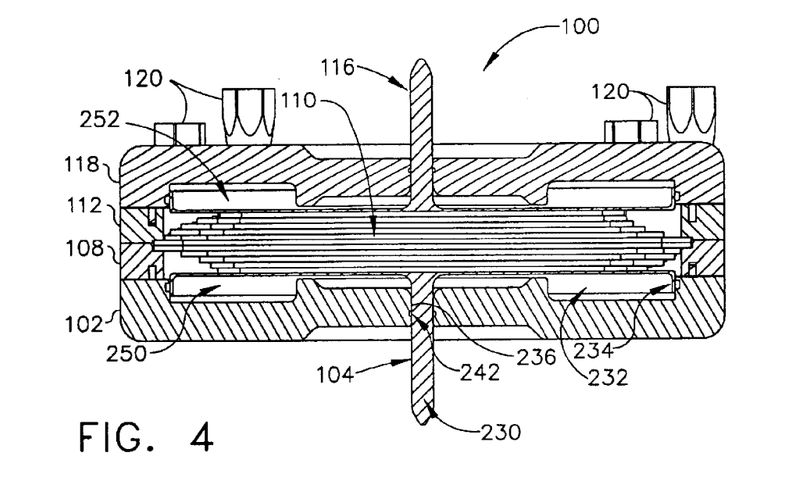
FIG. 4 is a cross-sectional front view of the fuel cell assembly of FIG. 2.
Figure 5:
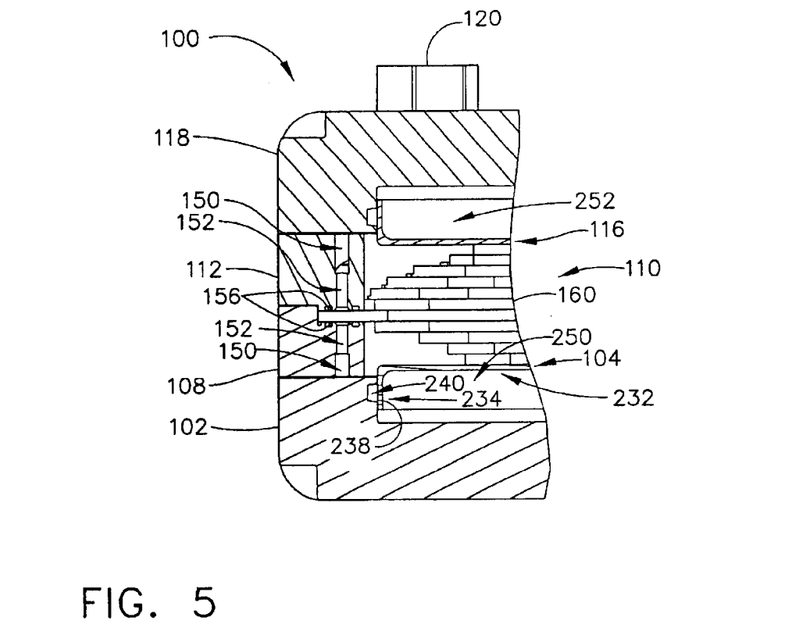
FIG. 5 is an enlarged partial cross-sectional view of the fuel cell assembly along line 5—5 of FIG. 2.
Figure 16:
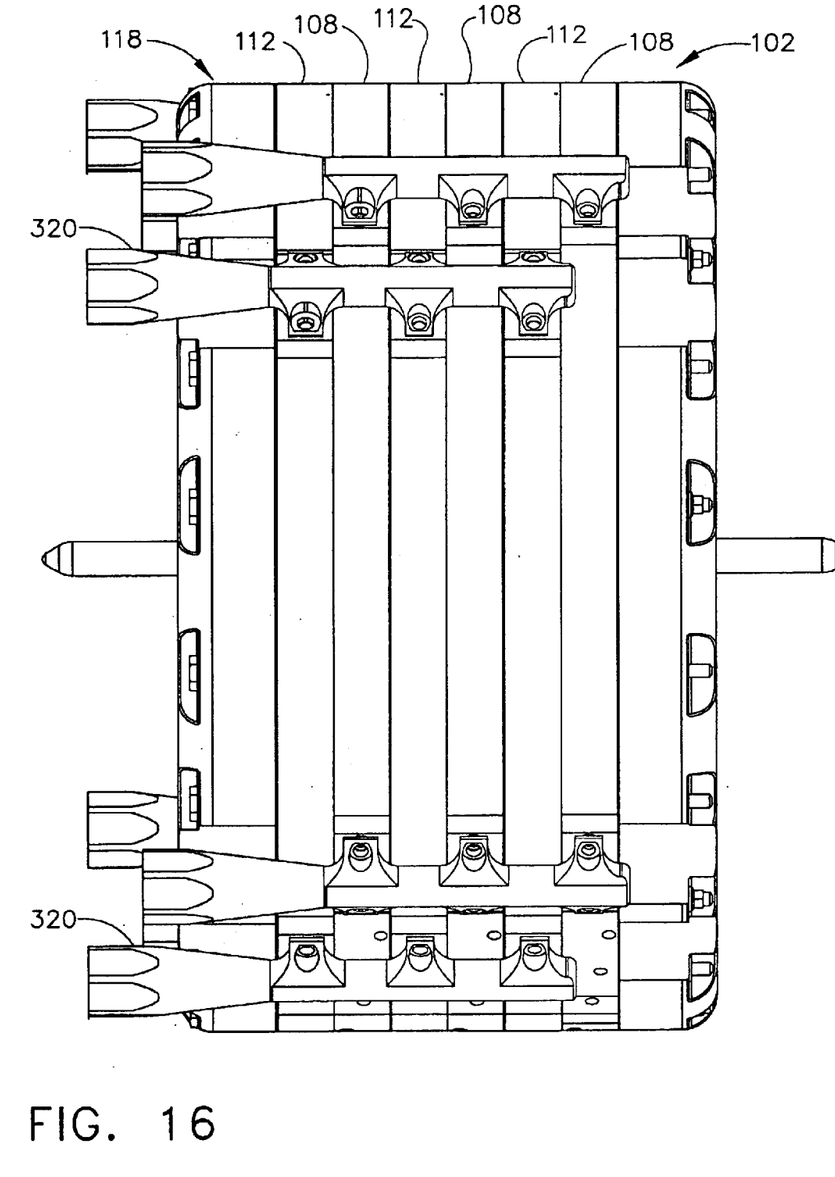
FIG. 16 is side view of an alternative exemplary preferred fuel cell assembly according to the present invention.

Referring to FIGS. 4 and 5, the exemplary preferred receptacles 108 and 112 are formed to receive a stack 110 of eleven (11) fuel cell plates as shown. It should be appreciated that the receptacles 108 and 112 can be modified to receive different numbers of fuel cell plates depending upon the desired output voltage. Furthermore, it should be appreciated that more than one pair of receptacles 108 and 112 can be positioned between the end caps 102 and 118. For example, and referring to FIG. 16, an alternative fuel cell assembly 300 according to the present invention is substantially the same as the fuel cell assembly 100 except that there are three (3) pairs of receptacles 108 and 112 positioned between the end caps 102 and 118 as shown. Additionally, the alternative fuel cell assembly 300 includes triple-ganged manifold inlets/outlets 320 which are attached to either the three bottom receptacles 108 or the three top receptacles 112 as shown. Exemplary preferred triple-ganged manifold inlets/outlets 320 are also made from a polymer such as the PEEK™ 450G polymer. In the exemplary preferred alternative fuel cell assembly 300, three (3) substacks of eleven fuel cell plates provide the 33 cells needed for a nominal 28 VDC fuel cell module.

Thermal expansion is an important consideration for the fuel cell assembly 100 and especially for the alternative fuel cell assembly 300 with its triple-ganged manifold inlets/outlets 320. Accordingly, the receptacles 108 and 112, the manifold inlets/outlets 120 and the triple-ganged manifold inlets/outlets 320 are preferably formed from the same material or from different materials which have similar rates (or coefficients) of thermal expansion.

Figure 10:
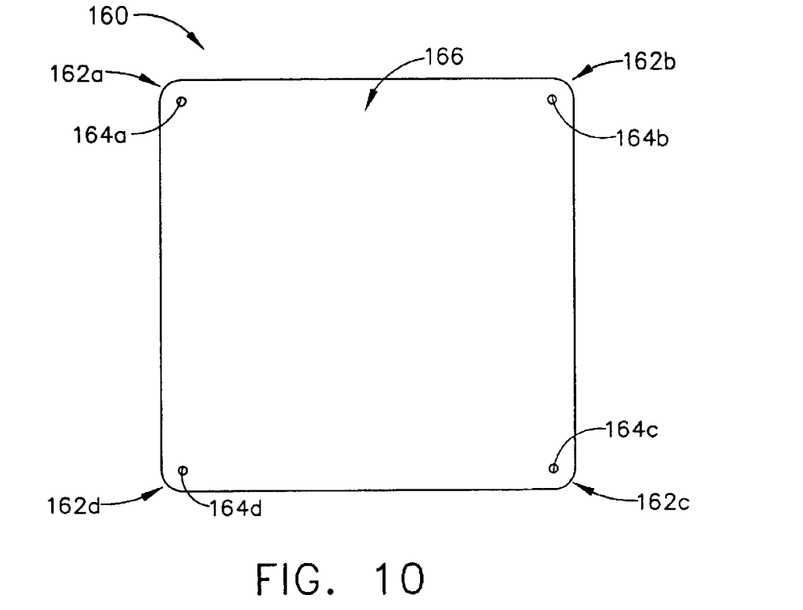
FIG. 10 is a front view of an exemplary preferred fuel cell plate assembly of the fuel cell assembly of FIG. 1.
Figure 11:
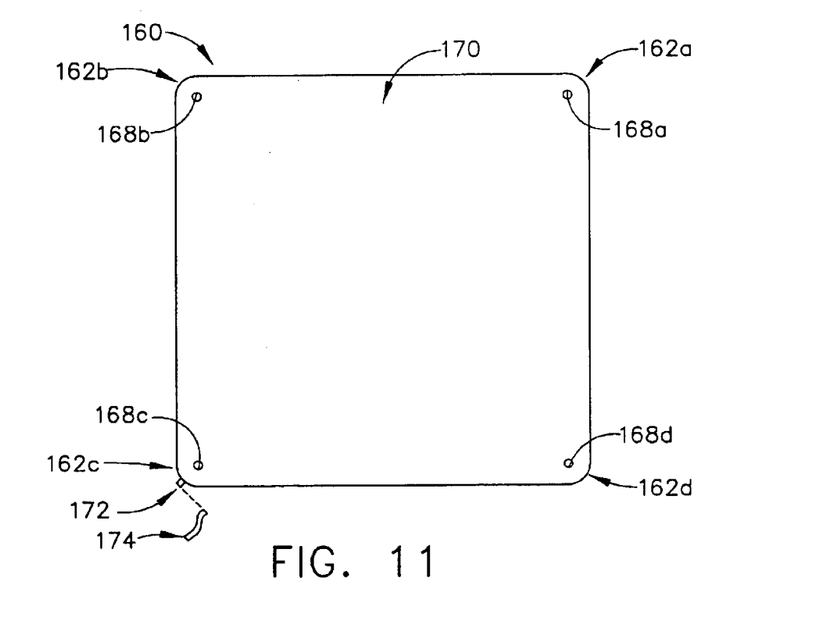
FIG. 11 is a back view of the fuel cell plate assembly of FIG. 10.

FIGS. 10 and 11 show front and back views, respectively, of an exemplary preferred fuel cell plate assembly 160 of the fuel cell stack 110. The fuel cell plate 160 is preferably formed with corners 162a, 162b, 162c, 162d which are shaped to complement the corner walls 134a, 134b, 134c, 134d, respectively. The fuel cell plate 160 includes a plurality of ports 164a, 164b, 164c, 164d positioned adjacent the corners 162a, 162b, 162c, 162d, respectively, on the front side 166 (e.g., cathode side) of the fuel cell plate 160. The fuel cell plate 160 also includes a plurality of ports 168a, 168b, 168c, 168d positioned adjacent the corners 162a, 162b, 162c, 162d, respectively, on the back side 170 (e.g., anode side) of the fuel cell plate 160. The ports 164a, 164b, 164c, 164d, 168a, 168b, 168c, 168d can be used for various fluids/gases depending upon the particular nature of the fuel cell plate 160. For example, they can be dedicated to the following functions as parenthetically indicated: port 164a (product $H_2O$ out), port 164b ($O_2$ out), port 164c ($O_2$ in), port 164d (product $H_2O$ out), port 168a ($H_2$ in), port 168b (coolant in), port 168c ($H_2$ out), port 168d (coolant out). Although the exemplary fuel cell plate 160 is square-shaped and has eight (8) ports, it should be understood that the principles of the present invention are equally applicable to fuel cell plates with different numbers of sides, e.g., a hexagonal-shaped or octagonal-shaped fuel cell plates, and fuel cell plates with different numbers of ports.

Generally, the number of ports on one side of a fuel cell 160 dictates the minimum number of manifolds 150 required in the receptacle 108, 112 which is to provide the fluidic interfaces with that side of the fuel cell 160. However, it should be understood that configurations other than a one-to-one, port-to-manifold arrangement are also contemplated as being within the scope of the present invention.

Referring to FIG. 12, each of the port interface surfaces 132 is provided with an o-ring seal 136 sized to interface with the port of the fuel cell 160 positioned over it. The o-ring seal 136 is made, for example, from an elastomer such as VITON® (DuPont), silicone or ethylene propylene rubber. FIG. 5 shows a fuel cell plate 160 interfaced with the receptacles 108 and 112. In the exemplary preferred fuel cell assembly 100, the o-ring seals 136 are positioned within recesses 156 in the port interfacing surfaces 132. The recesses 156 encircle the openings of the conduits 152. Thus, the o-ring seals 136 function as "port interfaces" which provide fluidic connections between the fuel cells 160 and the receptacles 108 and 112. It should be appreciated that the ports and their respective seals are not limited to being circular in shape. Furthermore, seals other than o-rings can be employed.

Referring to FIGS. 10 and 11, the ports 164a, 164b, 164c, 164d, 168a, 168b, 168c, 168d, as positioned, directly interface into the flow field areas of the fuel cell plate 160. The spiral arrangement makes the corners of each single cell available to allow interfacing of the input/output fluids to either side of the single cells and at each corner for direct access to the active area of each cell and permits the corner ports on each fuel cell to be located inside the flow field. As a result, the exemplary preferred fuel cell plate 160 is formed with a narrow perimeter (approximately ⅛ inch wide) outside the area of the flow fields for sealing the MEA between the anode and the cathode, i.e., bonding the laminations of the fuel cell components together to form the single cell. Thus, the spiral stack arrangement of the fuel cell assembly 100 facilitates a decrease in the size of the cell sealing surfaces without decreasing the active area of the fuel cell as contrasted to a non-spiral stack of fuel cells. This decrease in the size of the cell perimeter area, in turn, provides a decrease in cell size and weight and, therefore, cost savings.

Square single cells provide eight (8) interfaces for each single cell with a rotational displacement field of 90°. The number of interface ports per cell can be increased or decreased depending upon the particular application. For example, a narrower rectangular cell having four (4) interface ports provides an input/output interface on the anode for the fuel (hydrogen) and an input/output port on the cathode for an oxygen or air inlet and an oxygen or air and product water outlet. Such an arrangement allows for a greater rotational displacement field of 180° which, in turn, allows a greater number of cells to be incorporated into each module. A six-sided, hexagonal-shaped cell allows for twelve (12) interface ports in a rotational field of 60°. An eight-sided, octagonal-shaped cell allows for sixteen (16) interface ports in a rotational field of 45 °.

The exemplary preferred fuel cell plate 160 also includes an electrically conductive tab 172 at one of its corners. The tab 172 is electrically connected, for example, to the anode. An electrically conductive wire 174 is soldered to the tab 172 to facilitate voltage monitoring. Referring to FIG. 3, holes 190 are provided through the receptacles 108, 112 to their peripheries to allow the wires 174 for each fuel cell plate 160 to be extended through one of the holes 190 to the outside of the fuel cell assembly 100. Exemplary preferred holes 190 are sufficiently large to permit 30 gage wire to pass therethrough.

The wires 174 extending from the tab 172 of each anode provide a negative polarity allowing the voltage of each fuel cell plate 160 to be measured relative to the single positive output terminal where the main electrical power is outputted. Additionally, the wires 174 extending from the tab 172 of each anode can be provided to an electrical connector (not shown) suitable for in-flight monitoring with an Electronic Control Unit (ECU) or the like. Each wire 174 is easily detached from the electrical connector to allow replacement of a single fuel cell 160 during maintenance actions.

Figure 8:
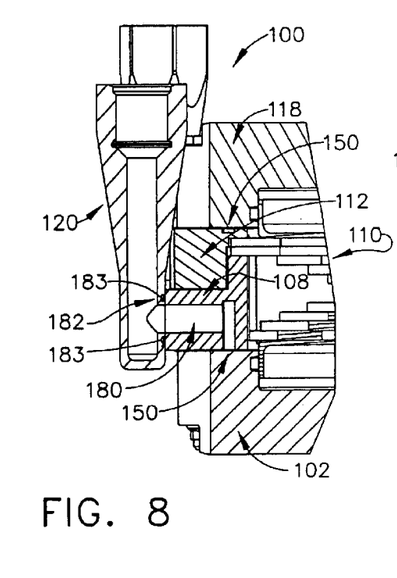
FIG. 8 is an enlarged partial cross-sectional view of the fuel cell assembly along line 8—8 of FIG. 2.
Figure 9:
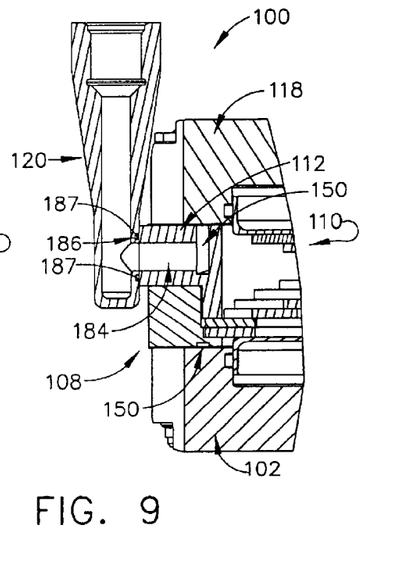
FIG. 9 is an enlarged partial cross-sectional view of the fuel cell assembly along line 9—9 of FIG. 2.

Referring to FIG. 8, the exemplary preferred lower receptacle 108 is formed with a passage 180 between an exterior surface 182 of the receptacle 108 and the manifold 150. The manifold inlet/outlet 120 is attached to the receptacle 108 over the passage 180. A conventional packing 183 is positioned adjacent the opening of the passage 180 as shown. Referring to FIG. 9, the exemplary preferred upper receptacle 112 is similarly formed with a passage 184 between an exterior surface 186 of the receptacle 112 and the manifold 150. The manifold inlet/outlet 120 is attached to the receptacle 112 over the passage 184. A conventional packing 187 is positioned adjacent the opening of the passage 184. The packings 183 and 187 are formed, for example, from an elastomer such as VITON® (DuPont), silicone or ethylene propylene rubber. Referring to FIG. 3, the manifold inlets/outlets 120 are secured to the receptacles 108 and 112 as shown with conventional bolts 188. Thus, the eight manifold inlets/outlets 120 shown in FIG. 2 provide the fluid/gas inputs and outputs to the fuel cell packaging assembly 100 required by each of the ports 164a, 164b, 164c, 164d, 168a, 168b, 168c, 168d of the fuel cell plates 160.

After the shims 106 and 114 are secured to the receptacles 108 and 112, respectively, the receptacles 108 and 112 are ready to receive the stack 110 of fuel cell plates 160. As discussed above, the fuel cell plates 160 are stacked in a staggered or spiral configuration complementary to the port interfacing sides 130 of the receptacles 108 and 112. Next, the receptacles 108 and 112 are detachably secured together.

Figure 6:
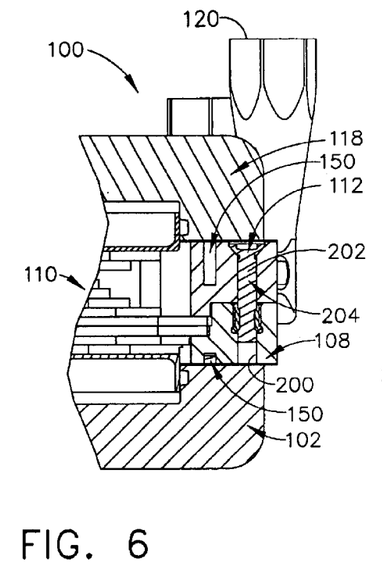
FIG. 6 is an enlarged partial cross-sectional view of the fuel cell assembly along line 6—6 of FIG. 2.

Referring to FIG. 14, an exemplary preferred bottom receptacle 108 is formed with a plurality of channels 200 which are spaced around the receptacle 108 as shown. The illustrated receptacle 108 includes four (4) of the channels 200. Referring to FIG. 6, the exemplary preferred upper receptacle 112 includes channels 202 which align with the channels 200. A plurality of bolts 204 are threaded through the channels 200 and 202 as shown. Exemplary preferred bolts 204 comprise a plastic such as the PEEK™ 450G polymer. After the receptacles 108 and 112 are secured together (and, in the case of the fuel cell assembly 300, after all of the pairs of receptacles 108 and 112 are stacked together), then the end caps 102 and 118 are added to the assembly.

Figure 7:
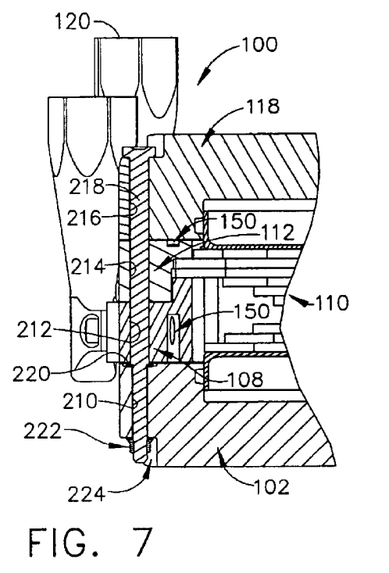
FIG. 7 is an enlarged partial cross-sectional view of the fuel cell assembly along line 7—7 of FIG. 2.

Referring to FIG. 7, in an exemplary preferred fuel cell assembly 100, the bottom end cap 102, the bottom receptacle 108, the top receptacle 112 and the top end cap 118 are formed with channels 210, 212, 214 and 216, respectively. As shown in the figure, the channels 210, 212, 214 and 216 are sized to receive a conventional shoulder bolt 218 therethrough. A conventional washer 220 is positioned between the bottom end cap 102 and the bottom receptacle 108. Another conventional washer 222 is positioned below and against the bottom end cap 102 in a recess 224. Referring to FIGS. 2 and 3, the exemplary preferred fuel cell assembly 100 includes twenty (20) each of the bolts 218 and washers 220 and 222. Preferably, the washers 222 are positioned along the bolts 218 to accommodate a slight thermal expansion of the receptacles 108 and 112.

Before the end caps 102 and 118 are added to the assembly 100, the pistons 104 and 116 are interfitted with the end caps 102 and 118, respectively. Referring to FIGS. 4 and 5, the pistons 104 and 116 are preferably identical and, therefore, only the exemplary preferred piston 104 is discussed.

The exemplary preferred piston 104 is formed as a single piece from a conductive material such as gold plated copper and includes a shaft portion 230, a plate portion 232 and a cantilevered edge portion 234. Alternatively, the shaft portion 230 and the plate portion 232 can be formed separately and then mechanically interconnected prior to use with the assembly 100. The shaft portion 230 is preferably cylindrical in shape, and sized to fit within a correspondingly shaped channel 236 in the end cap 102.

As best shown in FIG. 5, the exemplary preferred end cap 102 includes a cylindrical inner surface 238. The cantilevered edge portion 234 faces the cylindrical inner surface 238 when the shaft portion 230 is fitted into the channel 236. An exemplary preferred cylindrical inner surface 238 includes a recess 240 which is packed with a sealing material, for example, an elastomer such as VITON® (DuPont), silicone or ethylene propylene rubber. Referring to FIG. 4, an exemplary preferred channel 236 includes a recess 242 which is also packed with a sealing material, for example, an elastomer such as VITON® (DuPont), silicone or ethylene propylene rubber.

Referring to FIGS. 4 and 5, the end cap 102 and the piston 104 define an enclosure 250 and thereby provide a mechanism for imparting a force to the stack 110 of fuel cells positioned between the receptacles 108 and 112. The end cap 118 and the piston 116 define an enclosure 252 and thereby provide a mechanism for imparting an opposing force to the stack 110 of fuel cells. Referring to FIGS. 1 and 2, the end cap 118 includes a pressure port 254 for pressurizing the enclosure 252. The end cap 102 includes a pressure port 256 (FIG. 1) for pressurizing the enclosure 250.

Referring back to FIGS. 4 and 5, the piston 104 is positioned between the enclosure 250 and the stack 110 of fuel cells such that the piston 104 is forced toward the stack 110 when the enclosure 250 is pressurized. Similarly, the piston 116 is positioned between the enclosure 252 and the stack 110 such that the piston 116 is forced toward the stack 110 when the enclosure 252 is pressurized. Thus, the fuel cell assembly 100 is pneumatically or hydraulically loaded via the pressure ports 254 and 256 to ensure good electrical contact between adjacent fuel cell plates 160 of the stack 110. Alternatively, a spring or other force mechanism can be employed.

Although the present invention has been described in terms of the preferred embodiment above, numerous modifications and/or additions to the above-described preferred embodiment would be readily apparent to one skilled in the art. It is intended that the scope of the present invention extend to all such modifications and/or additions.

I claim:

1. A method for fuel cell packaging comprising the steps of:

providing a fuel cell receptacle with a plurality of manifolds;

providing a plurality of fuel cells, the fuel cells including top and bottom sides with respective ports; and positioning the fuel cells within the fuel cell receptacle in a stack such that both the top and bottom ports of each of the fuel cells are in direct contact with the receptacle and each of the ports is individually interfaced with one of the manifolds.

2. A method for fuel cell packaging as claimed in claim 1, wherein the ports are positioned on corners of the fuel cells.

3. A method for fuel cell packaging as a claimed in claim 1, wherein the ports are positioned on both sides of the fuel cells.

4. A method for fuel cell packaging as claimed a claim 1, wherein the positioning step comprises positioning the fuel cells in a staggered configuration.

5. A method for fuel cell packaging as claimed in claim 1, wherein the positioning step comprises positioning the fuel cells in a spiral configuration.

6. An apparatus for fuel packaging comprising:

a receptacle including a plurality of port interfaces, the receptacle being shaped to receive a stack of fuel cells with top and bottom sides with respective ports such that the port interface directly contacts each of the ports providing individual fluidic connections between each of the ports and the port interfaces that they respectively contact.

7. An apparatus for fuel cell packaging as claimed in claim 6, wherein the receptacle is shaped to receive the fuel cells in a staggered stack.

8. An apparatus for fuel cell packaging as claimed in claim 6, wherein the receptacle is shaped to receive the fuel cells in a spiral stack.

9. An apparatus for fuel cell packaging as claimed in claim 6, wherein each of the port interfaces includes an o-ring seal.

10. A method for fuel cell packaging comprising the steps of:

providing a fuel sell receptacle with a plurality of manifolds;

providing a plurality of fuel cells, the fuel cells including top and bottom sides and ports; and positioning the fuel cells within the fuel cell receptacle in a stack in a spiral configuration such that both the top and bottom sides of each of the fuel cells are in direct contact with the receptacle and each of the ports is interfaced with one of the manifolds.

11. An apparatus for fuel cell packaging comprising:

a receptacle including a plurality of port interfaces, the receptacle being shaped to receive a spiral stack of fuel cells with ports on opposing sides of the fuel cells such that the port interface directly contacts each of the ports providing individual fluidic connections between each of the ports and the port interfaces that they respectively contact.

* * * * *